(12) United States Patent
Bullister

(10) Patent No.: US 8,539,705 B2
(45) Date of Patent: Sep. 24, 2013

(54) CROSSFOLD ELECTRONIC DEVICE

(76) Inventor: Edward Bullister, Weston, MA (US)

( * ) Notice: Subject to any disclaimer, the term of this patent is extended or adjusted under 35 U.S.C. 154(b) by 1029 days.

(21) Appl. No.: 12/190,720

(22) Filed: Aug. 13, 2008

(65) Prior Publication Data

US 2010/0041439 A1 Feb. 18, 2010

(51) Int. Cl.
*G06F 1/16* (2006.01)

(52) U.S. Cl.
CPC .................................. *G06F 1/1641* (2013.01)
USPC ................. 40/733; 40/729; 345/1.1; 345/1.3; 361/679.04

(58) Field of Classification Search
CPC ............................ G06F 1/1641; G06F 1/1618
USPC .................. 345/1.1, 1.3, 168, 169; 400/472; 40/729, 730, 733, 606.19; 361/679.04
See application file for complete search history.

(56) References Cited

U.S. PATENT DOCUMENTS

| | | | |
|---|---|---|---|
| 3,940,758 A | 2/1976 | Margolin | |
| 4,075,702 A | 2/1978 | Davies | |
| 4,436,135 A * | 3/1984 | Ytter | 160/135 |
| 4,517,660 A | 5/1985 | Fushimoto et al. | |
| 4,597,681 A | 7/1986 | Hodges | |
| 4,606,553 A | 8/1986 | Nickerson | |
| 4,620,581 A | 11/1986 | Wallace | |
| 4,703,160 A | 10/1987 | Narishima et al. | |
| 4,799,771 A | 1/1989 | Taniguchi | |
| 4,918,632 A | 4/1990 | York | |
| 4,939,514 A | 7/1990 | Miyazaki | |
| 5,067,543 A | 11/1991 | Bove | |
| 5,128,662 A | 7/1992 | Failla | |
| 5,163,765 A | 11/1992 | Levy | |
| 5,187,644 A | 2/1993 | Crisan | |
| 5,233,502 A | 8/1993 | Beatty et al. | |
| 5,260,885 A | 11/1993 | Ma | |
| 5,278,779 A | 1/1994 | Conway | |
| 5,333,116 A | 7/1994 | Hawkins | |
| 5,375,076 A | 12/1994 | Goodrich | |
| 5,383,138 A | 1/1995 | Motoyama | |
| 5,410,333 A | 4/1995 | Conway | |
| 5,416,730 A | 5/1995 | Lookofsky | |
| 5,515,900 A * | 5/1996 | West et al. | 160/135 |
| 5,574,481 A | 11/1996 | Lee | |
| 6,088,220 A * | 7/2000 | Katz | 361/679.15 |
| 6,151,012 A | 11/2000 | Bullister | |
| 6,256,017 B1 | 7/2001 | Bullister | |
| 6,580,932 B1 | 6/2003 | Finke-anlauff | |
| 6,587,096 B2 | 7/2003 | Bullister | |
| 6,679,639 B2 | 1/2004 | Katz | |

(Continued)

FOREIGN PATENT DOCUMENTS

| | | | | |
|---|---|---|---|---|
| JP | 09026833 | A | * | 1/1997 |
| JP | 09311737 | A | * | 12/1997 |
| JP | 10319879 | A | * | 12/1998 |
| JP | 2007115239 | A | * | 5/2007 |

*Primary Examiner* — Daniel J Colilla

(57) ABSTRACT

A computing device with a keyboard and display is configurable to fold from a compact and protective pocket sized closed configuration to other computing configurations. An embodiment of the device includes dispersed or interspersed hinge mechanisms to enable a cross folding mechanism to configure the device to multiple configurations using only simple hinges. An embodiment of the device further unfolds to a fully flat configuration supported by interspersed feet. Keys of reduced aspect ratio can reduce the footprint of a folded device without reducing the key's sideways spacing. A rotating input pad can supplement the keyboard input without increasing the footprint of the folded pocked sized configuration.

8 Claims, 16 Drawing Sheets

(56) References Cited

U.S. PATENT DOCUMENTS

| | | |
|---|---|---|
| 6,697,055 B1 | 2/2004 | Bullister |
| 6,894,661 B1 | 5/2005 | Tuli |
| 6,972,699 B2 | 12/2005 | Olodort |
| 6,991,389 B2 | 1/2006 | Mochizuki et al. |
| 7,031,143 B2 | 4/2006 | Madsen |
| 7,126,588 B2 | 10/2006 | Oakley |
| 7,193,614 B2 | 3/2007 | Bullister |
| 7,328,050 B2 | 2/2008 | Cheng |
| 7,382,355 B2 | 6/2008 | Hermann |
| 7,855,879 B2 * | 12/2010 | Kim .......................... 361/679.28 |
| 2004/0052044 A1 | 3/2004 | Mochizuki et al. |
| 2004/0169642 A1 | 9/2004 | Olodort et al. |
| 2005/0002158 A1 | 1/2005 | Olodort |
| 2005/0099361 A1 * | 5/2005 | Majer ............................ 345/1.3 |
| 2005/0125570 A1 | 6/2005 | Olodort et al. |
| 2005/0159194 A1 | 7/2005 | Heintz et al. |
| 2007/0279315 A1 * | 12/2007 | Laves et al. .................... 345/1.1 |
| 2008/0068288 A1 * | 3/2008 | Henkel ........................... 345/1.3 |
| 2009/0021496 A1 * | 1/2009 | Silzars ........................... 345/204 |

\* cited by examiner

A-A

B-B

CROSSFOLD ELECTRONIC DEVICE

FIELD OF INVENTION

Inventions described herein relate to portable electronic devices and specifically to those using hinges and other means that reduce the size of the devices to achieve greater portability and greater utility.

BACKGROUND

Previous portable computing devices invoke various methods to reduce the device size to gain portability while trying to maintain the functionality of a full sized computing device. Cellular phones use a sliding component to expand the visible footprint by extending a section of the housing to expose a keyboard. However, the keyboard width is limited to the width of the closed device. Furthermore, in the closed state the display is not protected but exposed to possible breakage.

Laptop computers allow for full sized keyboards and displays and provide limited protection to one side of the display surface when folded. However, laptop computers generally are heavy and require unwieldy protection for the display and are too large to fit into a pocket. Other designs include collapsible displays, but involve complex hinge systems which have more friction and less versatility than simple rotatable hinges.

Inventions described herein overcome the limitations of prior devices by configuring hinges to allow a large area display and a full sized keyboard to easily collapse to a very portable state with a small footprint.

The applicant previously was awarded U.S. Pat. No. 6,151,012 ('012), entitled MULTIFUNCTIONAL PORTABLE COMPUTING DEVICE WITH SPECIAL HOUSING" and U.S. Pat. No. 6,256,017 ('017), entitled COLLAPSIBLE KEYBOARD AND DISPLAY MECHANISM FOR A COMPUTER SYSTEM. The applicant does not claim priority to these two previous patents but incorporates them fully herein into this application by reference.

SUMMARY

These inventions include a system for hinging a crossfold computing device that enables using simple, robust hinges to effect a transition from a folded configuration to several other configurations. Different embodiments of the inventions can be positioned in several different configurations. In a laptop configuration, the keyboard and display are configured to provide functionality similar to that of a laptop computer. In a prone configuration an embodiment of the device is suitable for handheld operation, in which the user can hold the device in one hand and interact with the device with the other hand. In a cell phone configuration the device is configured as a flip-open phone. In a flat configuration the device can be readily used for touch input on a table or other planar surface. In a closed configuration the display modules are fully cushioned and protected. An interspersed crossfold hinge arrangement is described which facilitates easy transition between these configurations. Keys of low aspect ratio and a pivotable trackpad, which can enhance the portability and functionality of a computing device, are also described.

OBJECTS AND ADVANTAGES

An advantage of an invention described herein is that four components of a crossfold computer can expand from a closed configuration to a flat configuration with a fourfold increase in area.

Further advantages of the various inventions are as follows:

The display modules can be protected by and cushioned between keyboard modules, with the movable keys acting to cushion the fragile display modules and isolate them from shock in the closed configuration.

The first folding axis can increase the area of the closed device by a factor of two, and facilitates a cell phone configuration.

The second folding axis increases the footprint of the device by another factor of two, so that the fully extended area is approximately four times the footprint of the closed device.

An accordion embodiment facilitates multiple folds parallel to the second folding axis for multiple increases in display area.

The keyboard-display hinges, which connect a keyboard module to a display module, can be positioned to allow the display modules to lie in a flat configuration on a table surface with the display modules coplanar with the bottom keyboard surfaces.

The flat configuration enables a table to support the display modules against forces from touch and pen input.

The interspersed feet on the display modules support the display modules of the device in a flat configuration so that it can lay on a table or other planar surface without the display module hinge protruding beyond the table surface.

The keyboard-keyboard hinges, which connect keyboard modules to each other, and display module-display module hinges, which connect display modules to each other, can be made coaxial and interspersed between one another, so that ordinary pin hinges can facilitate the cross folding. As used herein, a keyboard hinge connects two keyboard modules. A display hinge connects two display modules. A keyboard to display hinge connects a keyboard module to a display module.

The hinges connecting the two display modules may be of lower diameter and strength and weight than the hinges connecting the two keyboard modules, the lower diameter reducing the size and need for the interspersed feet on the display modules.

A single stop mechanism on the hinges connecting the keyboard components can act to fix the rotation of both the keyboard-keyboard hinges and the coaxial display-display hinges at several different angles.

One of these stopped angles can be a zero angle to snap closed the device in a closed configuration suitable for storage in a pocket.

Another of these angles can be 180 degrees, suitable for a prone configuration to facilitate accessing any keypads and displays on the reverse face of the display modules, for handheld operation.

Yet another of these angles can be an obtuse angle suitable for use of the device as a flip-open cell phone with a speaker and microphone appropriately positioned for a phone conversation.

Another advantage of an invention described herein is that these multiple angles allow access to both sides of the display modules.

Another advantage is that the reverse faces of the display modules can support additional displays or keyboards for use in the prone and cell phone configurations.

Another advantage is that when the keyboard angle is 180 degrees, a set of keyboard-to-display hinges can unfold to separate the axes of the display and keyboard hinges to configure the device in an open laptop configuration.

Another advantage is that when the axes are so separated in the open laptop configuration, both sets of hinges are kept rigid at 180 degrees by each other, and the combined structure's components support each other against bending as is done in an L-shaped beam.

Yet another advantage is that four display components can be configured with the visible portions nearly contiguous at the center and electronic driver elements at the perimeter.

The above advantages can be realized by the user simply performing simple unfolding motions.

Another advantage is that the keys can be of lowered aspect ratio, so that a larger side-to-side key spacing can accommodate the spacing of the fingers, but a smaller front-to-rear key spacing facilitates a narrower footprint for the folded device.

An optional retractable input pad allows for a pointing device input without extending the footprint of the folded device A pivot on a retractable input pad allows for retraction through rotation, as opposed to linear sliding, reducing the distance of movement required of any wires to the input pad.

A rotational pivot on a retractable input allows for a rotational torsional spring to effect retraction, reducing the distance of movement required by the spring.

The above advantages can be realized with hardware that can use only simple hinges that involve only rotational (rather than the more complex linear sliding) motion.

BRIEF DESCRIPTION OF THE DRAWING

The features, aspects, and advantages of the present inventions will become better understood with regard to the following description, appended claims and accompanying drawing, where:

Figure 1:
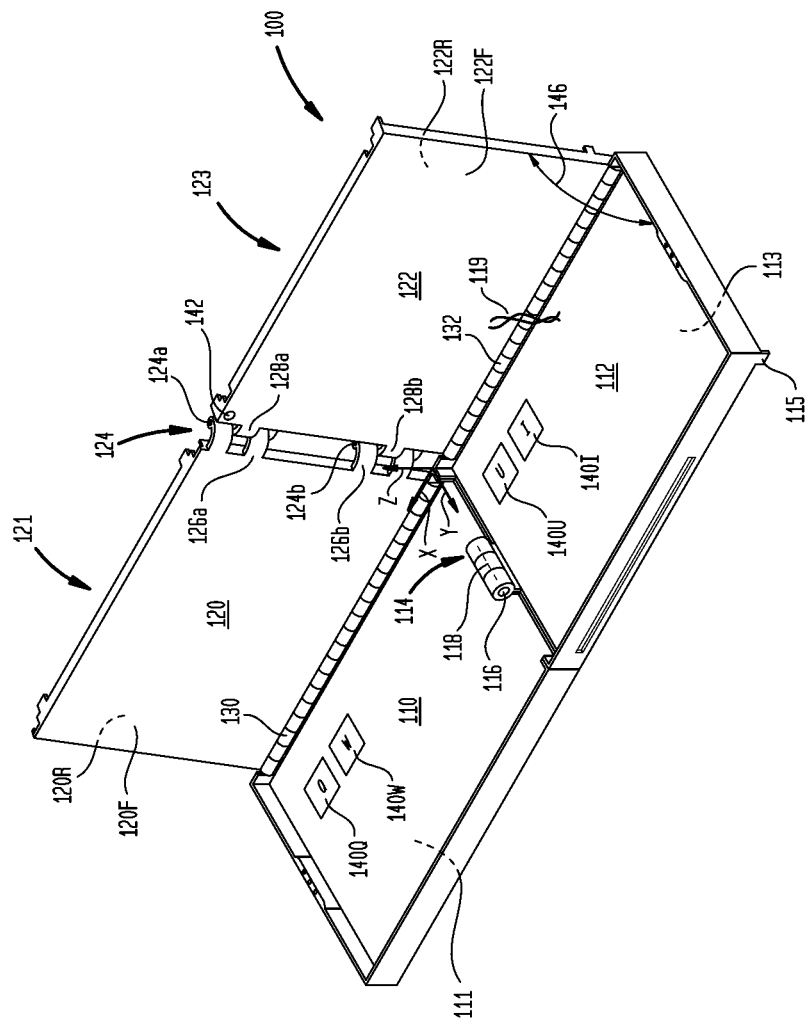
FIG. 1 shows an embodiment in a laptop configuration in which the display has been raised to an obtuse angle with respect to the keyboard 110, 112. In this configuration the display hinge mechanisms 124a, 124b are not coaxial with the keyboard hinge mechanisms 114.

The x-y-z Cartesian coordinate system shown in FIG. 1 is fixed with respect to left keyboard component 110, with the x-axis oriented laterally toward the left end of the keyboard, the y-axis oriented toward the front of the keyboard and coinciding with the axis of keyboard hinge mechanism 114, and the z-axis oriented upward.

Figure 2:
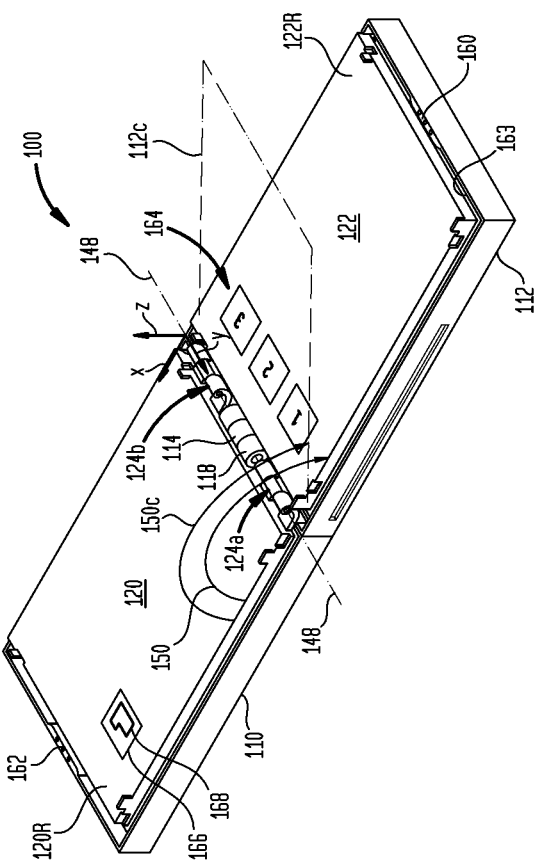

FIG. 2 shows the same embodiment of the device in a prone configuration, in which the display hinge mechanisms 124a, 124b and keyboard hinge mechanisms 114 are coaxial and parallel to the y-axis.

Figure 3:
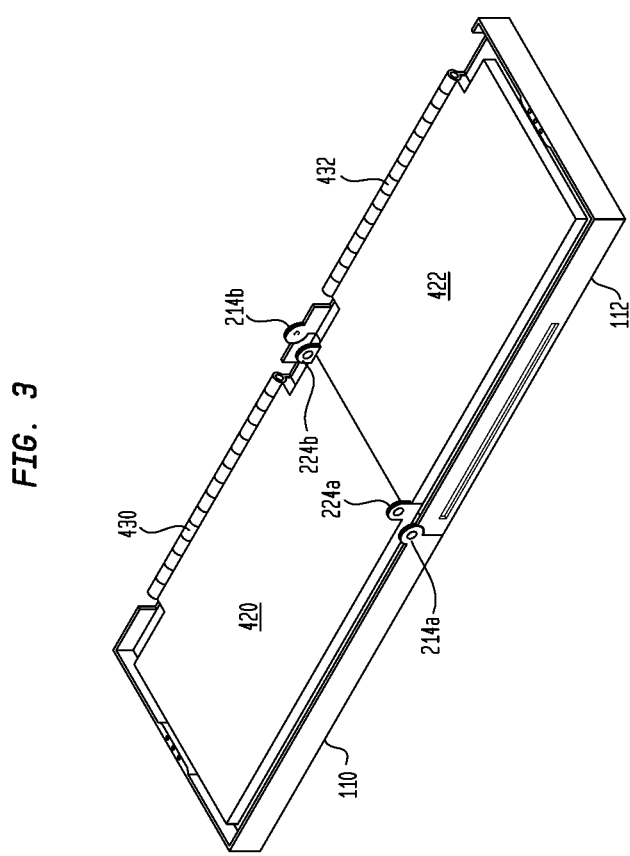

FIG. 3 shows hinge detail in an alternate embodiment in a prone configuration, in which the display hinge mechanisms and keyboard hinge mechanisms are coaxial and parallel to the y-axis. In addition they also straddle the display modules.

Figure 4:
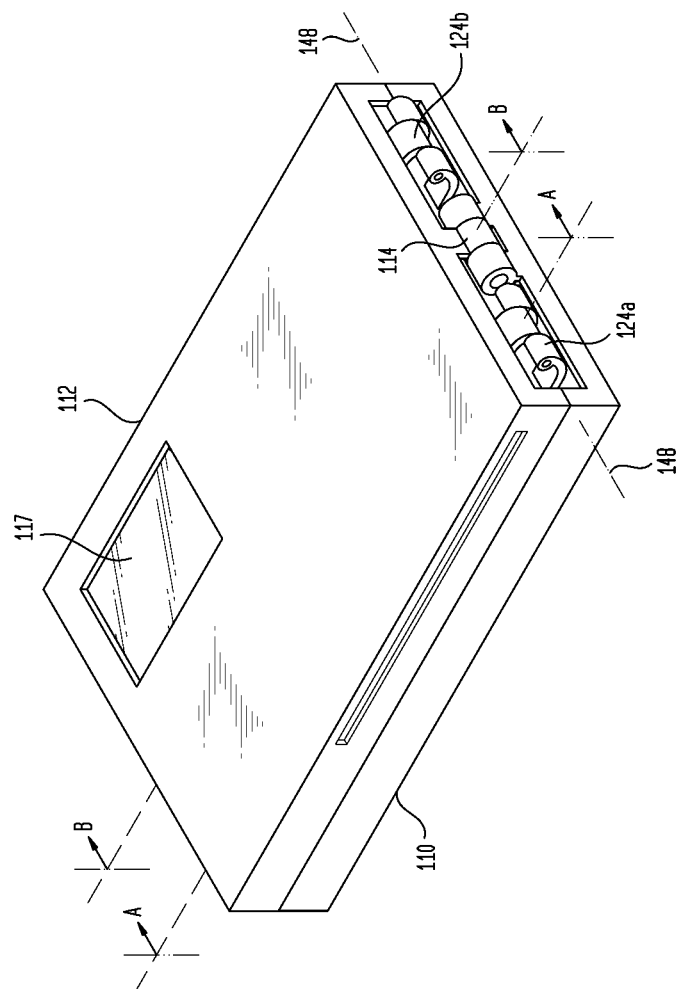

FIG. 4 shows an embodiment of a device in a closed configuration, in which the display to display hinge mechanisms and keyboard hinge mechanisms are coaxial.

Figure 5:
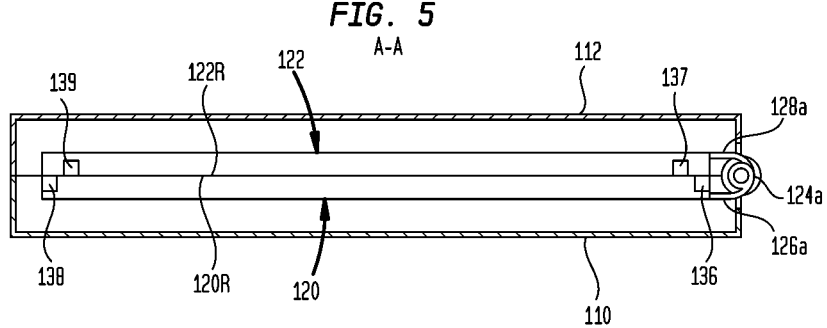

FIG. 5 is a cross section along lines A-A of FIG. 4, which shows a cut-through of display to display hinge mechanism 124a.

Figure 6:
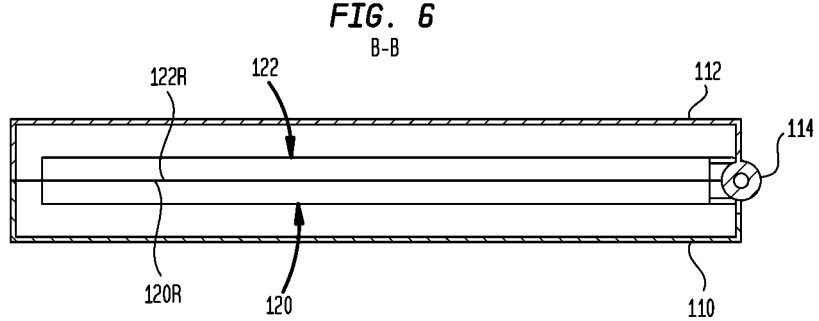

FIG. 6 is a cross section along lines B-B of FIG. 4, which shows a cut-through of keyboard hinge mechanism 114.

Figure 7:
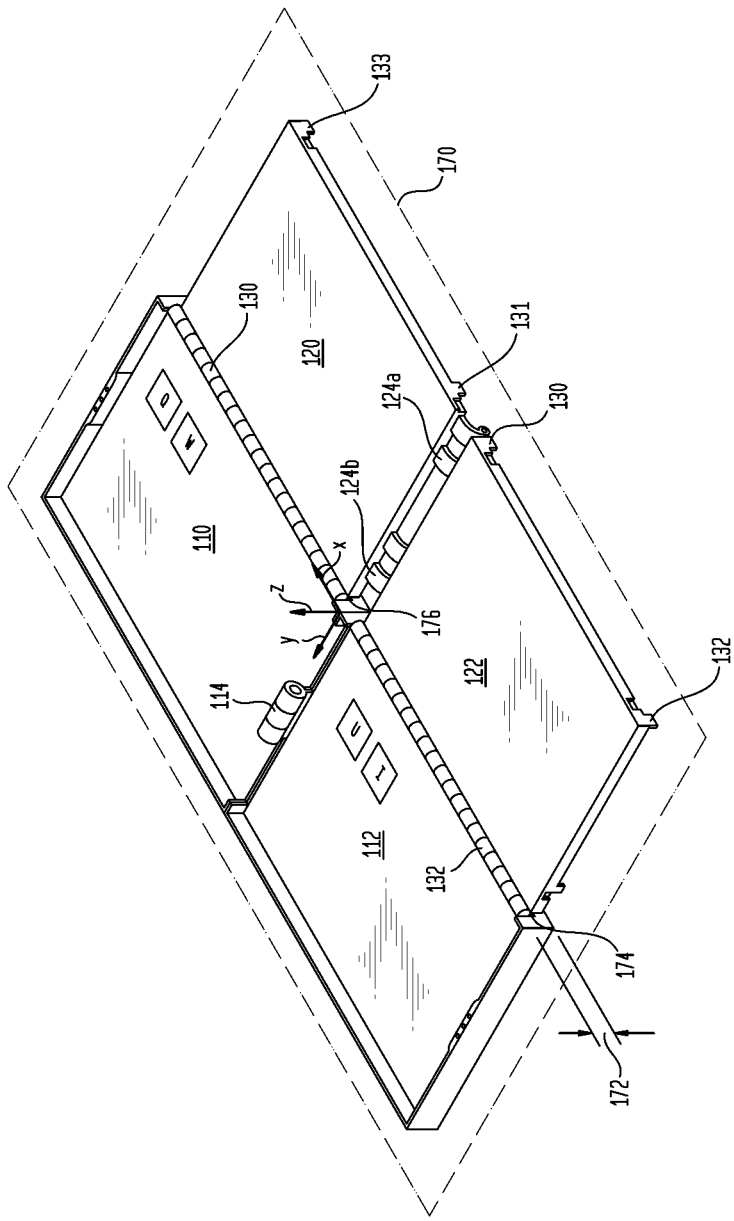

FIG. 7 is a rear perspective view of a device in a flat configuration in which all four components share a common support plane so that the device can be laid on a flat table surface.

Figure 8:
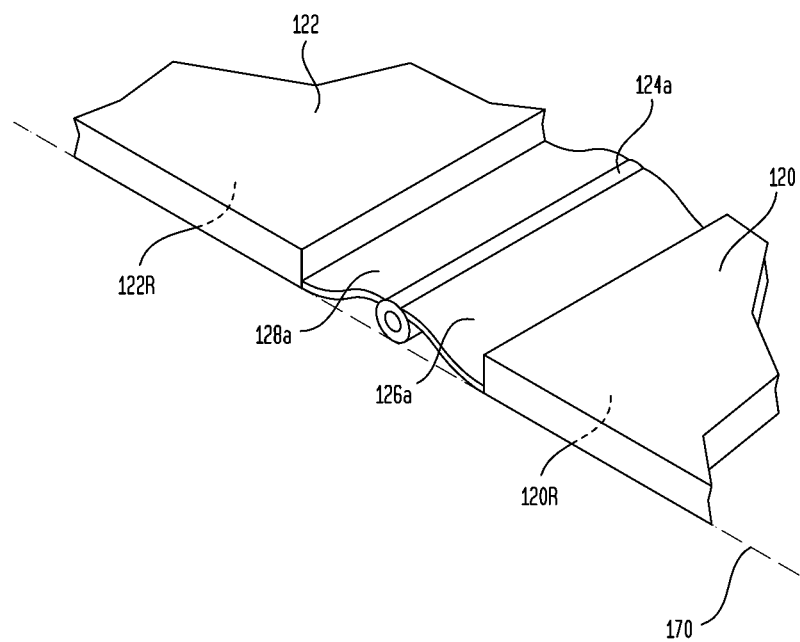

FIG. 8 shows a detail of a movable display hinge mechanism 124a.

Figure 9:
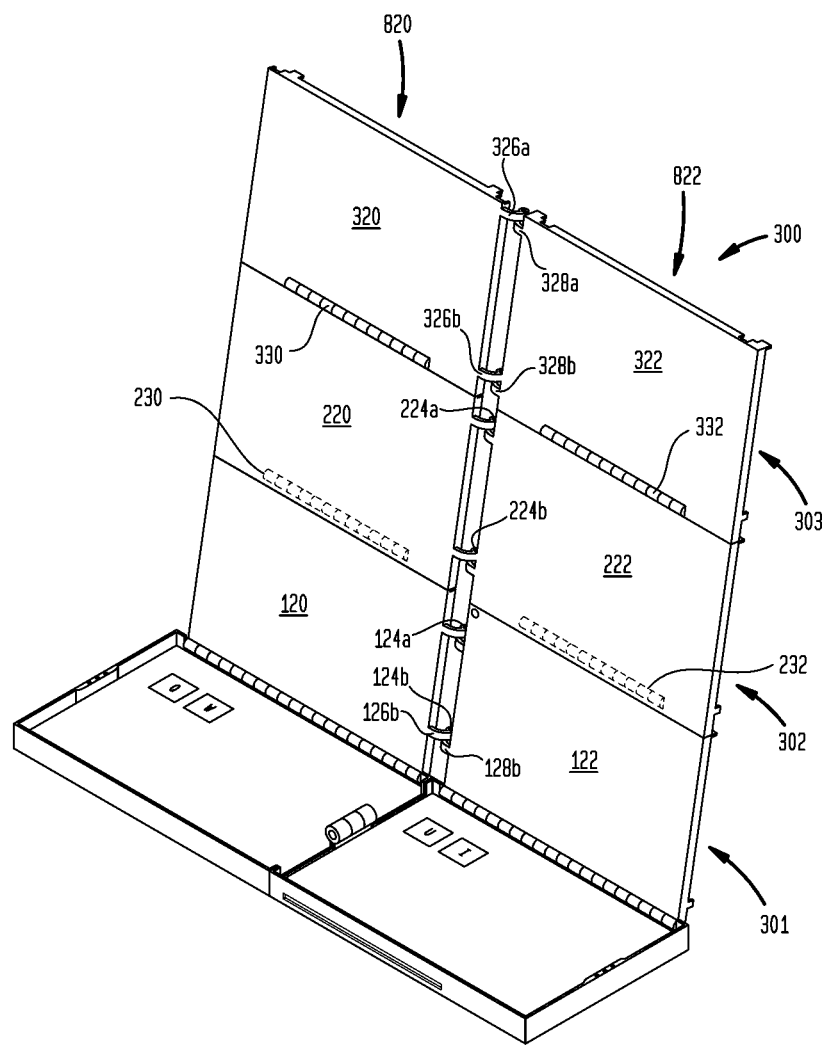

FIG. 9 shows an accordion embodiment of a display in an extended configuration.

Figure 10:
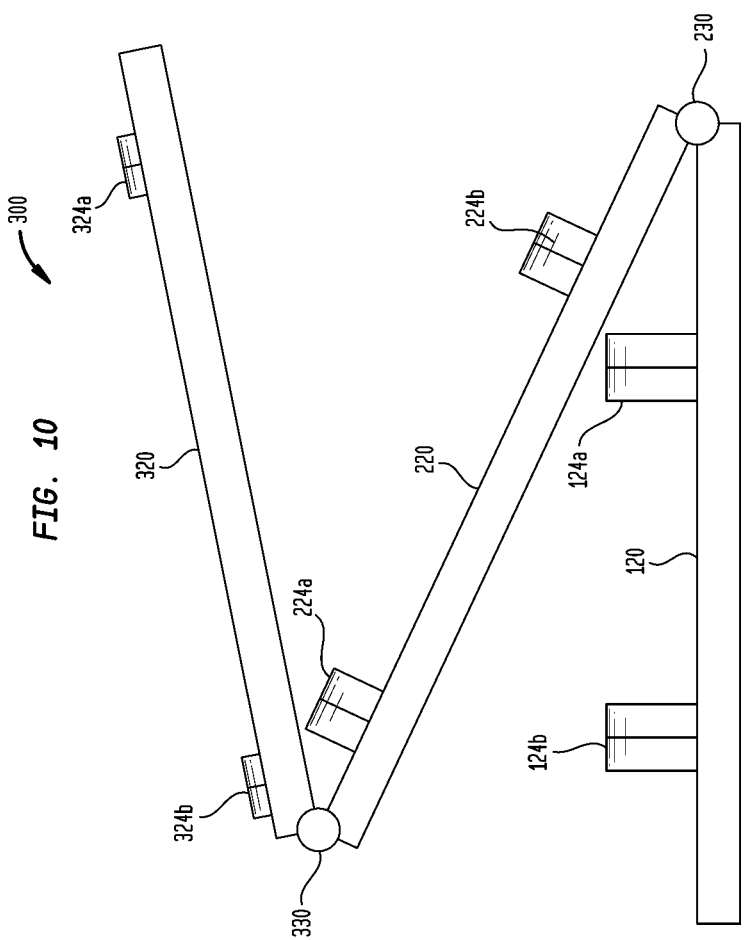

FIG. 10 shows a side view of an accordion embodiment in which the display is being folded in a zig-zag configuration to a partially closed configuration.

Figure 11:
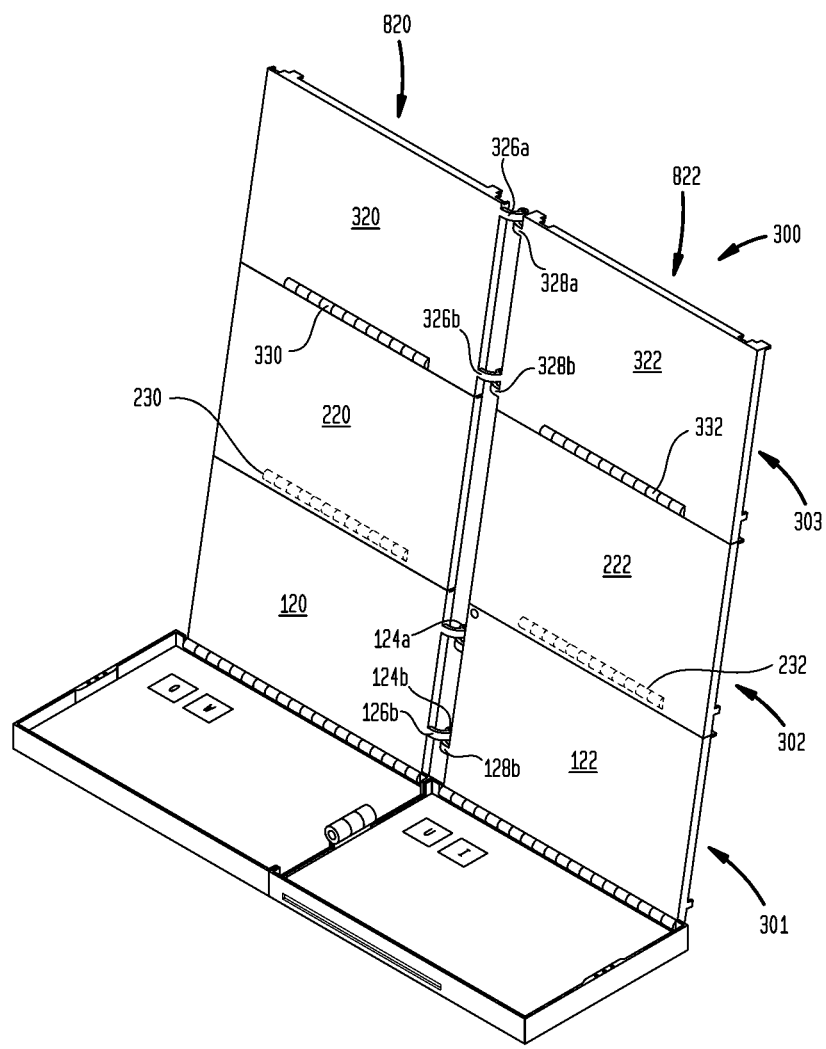

FIG. 11 shows an alternate embodiment of the device shown in FIG. 9, which is free of hinge mechanism 224, which could protrude in front of display modules in the fully open configuration.

Figure 12:
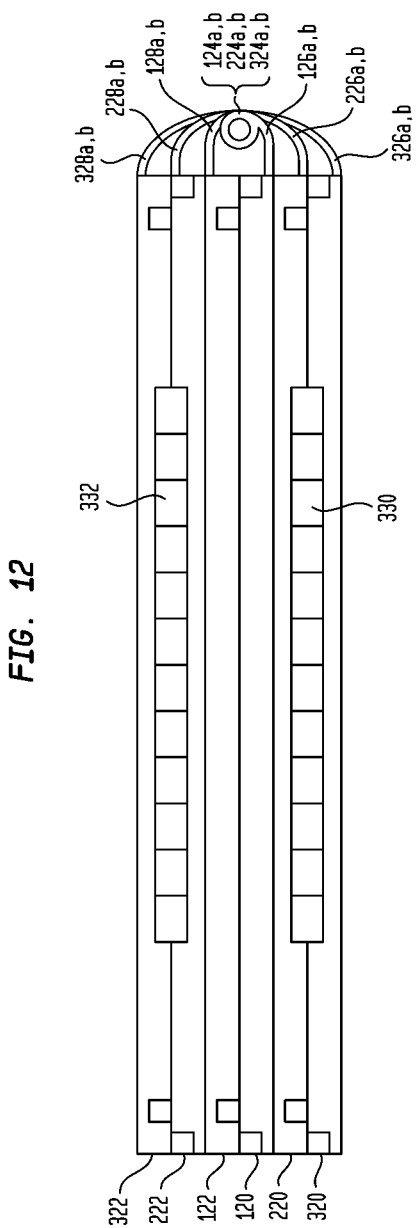

FIG. 12 shows an accordion embodiment of a display in the fully closed configuration.

Figure 13:
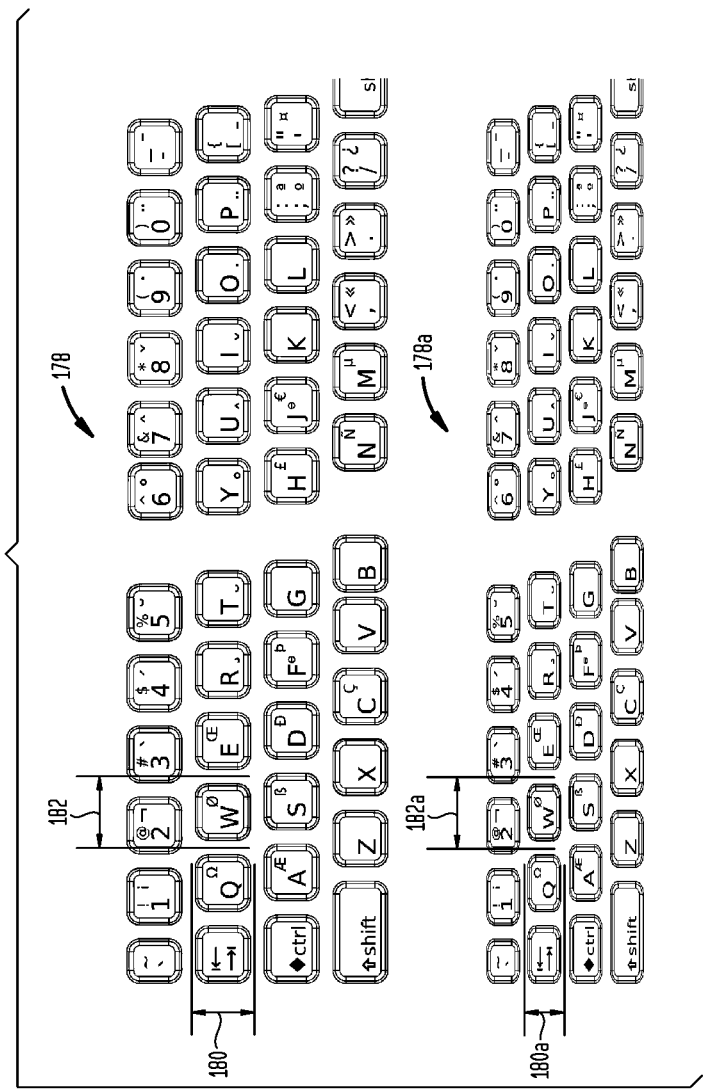

FIG. 13 shows a set of conventional keys and a set of keys in a squeezed keyboard embodiment, in which the keys are of a low aspect ratio.

Figure 14:
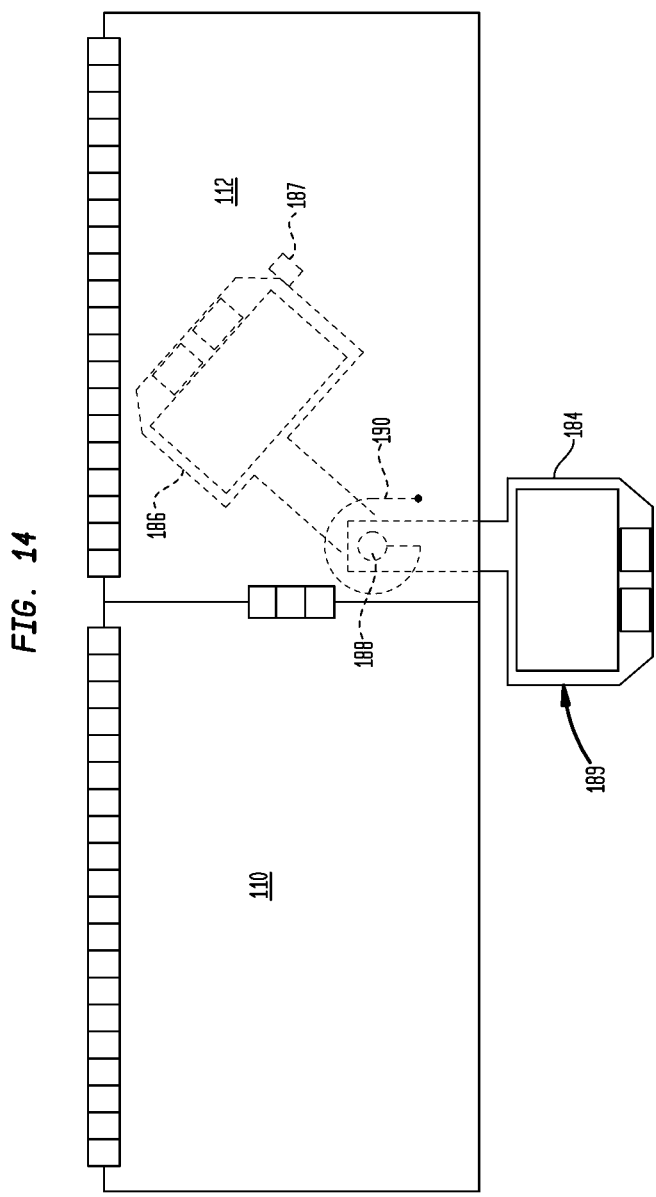

FIG. 14 shows a pivotally retractable trackpad.

Figure 15:
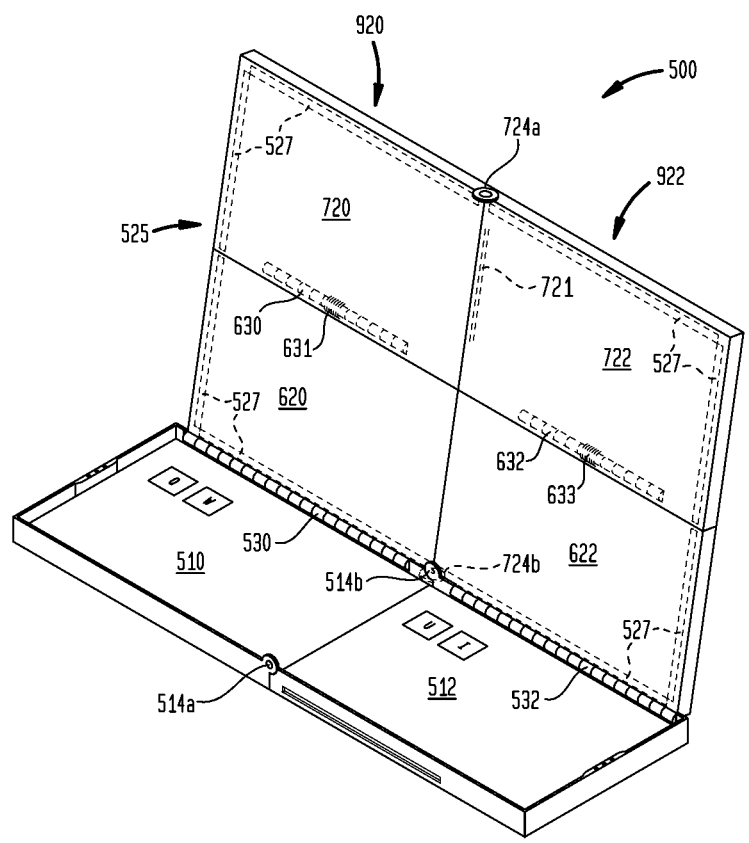

FIG. 15 shows an embodiment in which four display modules are arranged to form a display surface that is contiguous or nearly contiguous.

Figure 16:
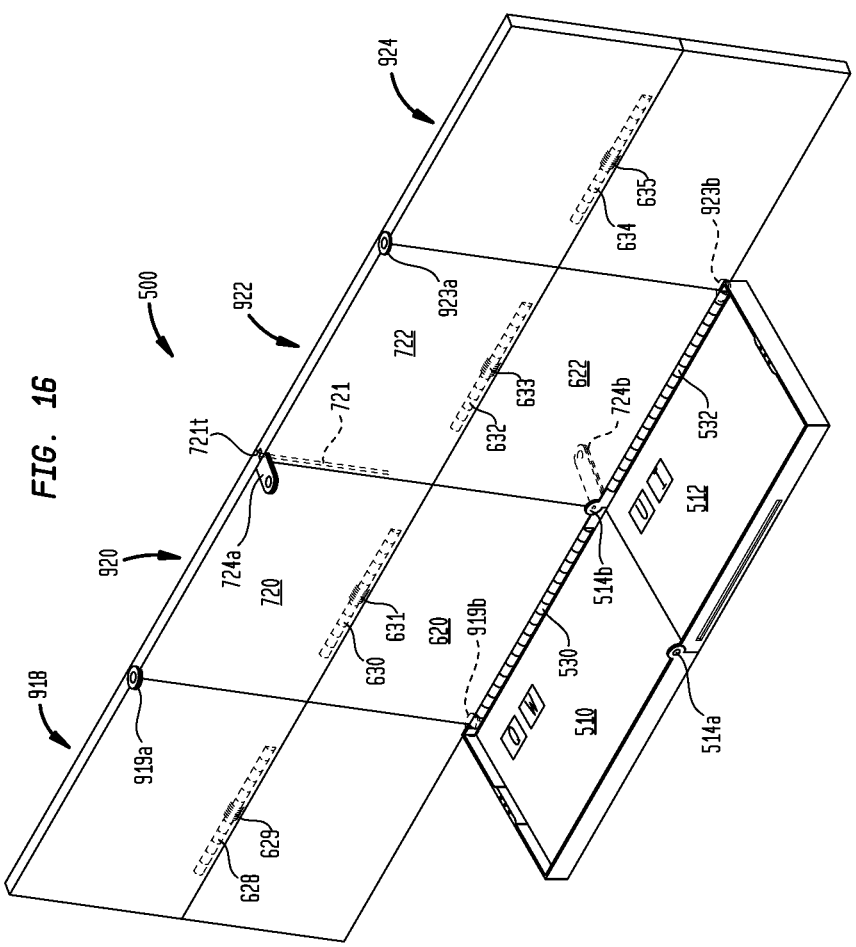

FIG. 16 shows an embodiment in which eight display modules are arranged to form a display surface that is contiguous or nearly contiguous.

Figure 17:
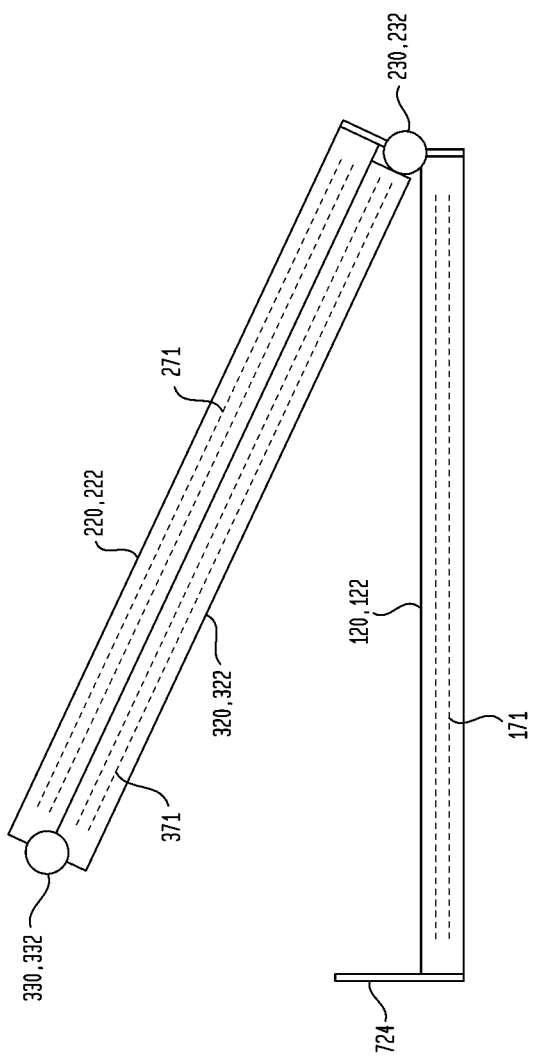

FIG. 17 shows a side view of a roll-up embodiment in which three rows of display modules are partially rolled up.

DESCRIPTION

The advantages of the current inventions are better understood by reference to the drawing.

Referring to FIG. 1, a cross fold computing device 100 includes a first keyboard module 110, a second keyboard module 112, a first display module 120 and a second display module 122. The first and second display modules 120 and 122 are arranged side-by-side as part of first and second columns 121 and 123. In FIG. 1 there is that there is exactly one display module in each column of display modules, but in some embodiments there are two or more display modules in each module column. The device uses the cross fold principle, in which a set of modules can fold sequentially along each of two perpendicular axes similar to the folding typically seen in a newspaper sheet or in a road map. A first hinge mechanism 114 rotatably connects keyboard modules 110 and 112, shown in FIG. 1 in a side-by-side, substantially coplanar configuration. A second hinge mechanism 124, with components 124a and 124b connects the display modules 120 and 122 which are shown in FIG. 1 in a side-by-side substantially coplanar configuration. Flexible cantilevered members 126a and 126b provide flexibility in the connection between the hinge mechanism 124a and the display modules 120 and 122. Third and fourth hinge mechanisms 130 and 132 rotatably connect modules 110 and 120 and 112 and 122, respectively. The electrical wires 119 can be run inside or adjacent to hinge mechanisms such as 132 that connect the display modules.

Keyboard support planes 111 and 113 intersect the bottom surfaces of keyboard modules 110 and 112, respectively. For embodiments in which the bottom surfaces of keyboard modules 110 and 112 are substantially planar, the bottom surfaces of keyboard overlap with the support planes 111 and 113. Where the surface elements such as the foot 115, protrudes from each bottom surface, the support plane would include peaks of the protrusions. The support plane is meant to establish the keyboard module location with respect to a flat surface on which it is laid.

Input keys such as 140Q and 140W and 140U and 140I face upward and are representative of the full set of keys in a computer keyboard such as a standard QWERTY keyboard used to input information. Additional input keys (for clarity, not shown) fill out the remainder of the substantially planar keyboard modules 110 and 112.

Continuing to refer to FIG. 1, the first hinge mechanism 114 may be a simple hinge mechanism that includes a circular cylindrical hinge pin such as 116 that fits inside a circular cylindrical sleeve that permits rotation between the components of the hinge mechanism. In contrast, some devices in the prior art use complex hinge mechanisms such as link hinge mechanisms or Soss hinge mechanisms that involve linearly sliding parts, which generally have more friction than the rotating parts of the simple pin hinge mechanism.

A camera 142 is configured to capture the image of the user. The angle of the camera is adjusted to face the user at the same time as the display modules 120 and 122 are adjusted by varying the display angle 146. The display angle 146 is the angle between the coplanar display modules 120 and 122 and the x-y plane. The x-y plane is parallel to the substantially coplanar keyboard modules 110 and 112.

In the laptop configuration shown in FIG. 1, the display angle 146 is not equal to zero so that the rotation axes of the first hinge mechanism 114 and second hinge mechanism 124 are not collinear. This gives the desired rigidity to the device and prevents bending about either hinge mechanism 114 or hinge mechanism 124. As a result, in this laptop configuration, this assembly has the rigidity associated with an angle beam. This is most rigid when the extended display is perpendicular to the extended keyboard because the three rotation axes of the three hinge mechanisms 114, 124, and 130 are mutually perpendicular. This rigidity is borne by shear stresses in the displays. In addition, the rigidity of the display modules again bending helps to support their own weight to keep the overall display in the desired planar condition. Details of the amount of rigidity and stresses can be calculated through methods described in Mechanical Engineering Design, by Joseph Shigley, McGraw-Hill, 1977, or using a finite element analysis package such as ANSYS, available through ANSYS, Inc. in Canonsburg, Pa.

FIG. 2 shows a prone configuration in which the display modules 120 and 122 have been closed toward the keyboard modules 110, 112, respectively, and the angle 146 has been reduced to zero. In this prone configuration, the first hinge mechanism, 114 and second hinge mechanism comprised of 124a and 124b are coaxial and are interspersed. The interspersed hinge mechanisms shown in FIG. 2 alternate twice; in moving along the common (co-)axis 148 in the positive y-direction, the hinge mechanism components alternate from 124b to 114 and back to 124a, for two transitions between the first (keyboard) hinge mechanism 114 and the second (display) hinge mechanism 124.

There are several different ways to intersperse the hinge mechanisms 114 and 124. FIGS. 1 and 2 show two transitions. In alternate embodiments, additional transitions can more evenly distribute the forces among the components, at the expense of more complexity.

In FIGS. 1 and 2, the components 124a and 124b of display hinge mechanism 124 straddle keyboard hinge mechanism 114, which lies between them. In alternate embodiments, components of hinge mechanism 114 could instead straddle hinge mechanism 124.

One such alternate embodiment of the interspersed hinge mechanisms is shown in FIG. 3. In FIG. 3 a keyboard hinge mechanism 214 is split into component hinge mechanisms 214a and 214b, which straddle hinge mechanisms 224a and 224b. Hinge mechanisms 224a and 224b, in turn, straddle the display modules 420 and 422. Hence, both hinge mechanisms 214 and 224 straddle display modules 420 and 422 in the prone configuration and in the fully closed configuration. This embodiment allows the display modules 420 and 422 to have more contiguous and less interrupted display surfaces because they are not interrupted by hinge mechanisms. In some embodiments, the hinge mechanisms 214 and 224 may straddle only the visible portions of display modules 420 and 422.

The tradeoff from straddling the display modules is that the most widely straddled components of hinge mechanism 214 may protrude awkwardly from the corners of the closed device. The outer components 214a may block or otherwise interfere with typing on keys near the spacebar. The inner components 214b or 224b may interfere with the display modules unfolding through hinge mechanisms 430 and 432. To avoid this interference during unfolding from the prone configuration of FIG. 3 to the laptop configuration shown in FIG. 1 extra spacing between 214b display modules 420 and 422 mat be required. This extra spacing can undesirably reduce the available size of the visible portions of display modules 420 and 422. Where multiple rows of display modules are used, such as the zig-zag embodiment to be described below in FIG. 9, some of the hinge mechanisms that straddle the displays would interfere with the zig-zag folding.

The interspersed arrangements provide structural rigidity. However, a dispersed arrangement in which only a single transition occurs may also be useful. A simple dispersion can be understood by considering FIG. 1 in which the display is made up of only hinge 124a and without hinge 124b. In such a dispersed configuration there is only one transition between hinge mechanisms 114 and 124.

In the prone configuration shown in FIG. 2, the keyboard angle 150 is 180 degrees. Because the axes of hinge mechanism 124 and 114 are collinear and both lie on the y-axis, the device can be folded about the y-axis and the keyboard angle 150 is fully adjustable from the 180 degrees shown to zero degrees (the fully closed configuration), as well as all angles between.

The hinge mechanism 114 preferably has a spring 118 that urges the device toward specific predetermined keyboard angles 150. One of these configurations is the fully closed configuration, in which the keyboard angle is zero degrees (to be shown more fully in FIG. 4).

Another configuration is the cell phone configuration in which the keyboard angle 150c is at an angle in the range between 0 and 180 degrees, preferably between 100 and 170 degrees. Keyboard module 112 is shown in the cell phone configuration in FIG. 2 as a dashed line labeled 112c to indicate that both the keyboard module 112 and display module 122 are angled to facilitate the cell phone configuration. The reduced angle 150c facilitates a partially folded device to be held adjacent to the user's face, with the microphone 160 and speaker 162 positioned close to the user's mouth and ear, respectively. The microphone 160 and speaker 162 are controlled by cell phone circuitry 163 (indicated only schematically in FIG. 2).

FIG. 2 shows rear surfaces of the display modules 120 and 122 that are labeled 120r and 122r, respectively. In the prone and cell phone configurations, these surfaces can be useful for displaying information related to use as a cellular phone or hand-held personal digital assistant. Accordingly, the embodiment of FIG. 2 shows a surface 122r that includes alpha-numeric keys 164 for dialing or other use. For clarity in FIG. 2 only typical keys 1, 2, and 3 are shown, but the full numeric (or alphanumeric) keypad (not shown) would also be included in most embodiments. These keys can be physical keys for good tactile feedback or virtual keys as part of a touch-sensitive or pen-sensitive input surface. Rear surface 120r can include a display module surface 166. For clarity only a single folder icon 168 is shown, but additional icons could invoke applications such as phonebooks and calendars. Display module surface 166 also may be touch-sensitive.

FIG. 4 shows an embodiment in a fully closed configuration. The keyboard modules 110 and 112 and the display modules 120 and 122 shown in FIG. 2 have been pivoted about the common axis 148 until the keyboard angle 150 is reduced to zero degrees. FIG. 4 also shows an external display 117 which may be used to alert the user of caller ID or other information when the device is in the fully closed configuration. External display 117 may be recessed below the surface of keyboard module 112 to prevent scratching of the surface of external display 117 when the device is laid flat on a table. FIG. 4 also shows the orientation of cross sections A-A and B-B.

Referring to FIG. 5, the cross section A-A through hinge mechanism 124*a* shows that the centerline of hinge mechanism 124*a* lies in both planes 120*r* and 122*r*, the rear surfaces of display modules 120 and 122. Note that because hinge mechanism 124*a* is centered, this means that one half of the diameter of the hinge mechanism protrudes on either side of the planes 120*r* and 122*r*. This protrusion can interfere with the ability of the device to lay flat in the flat configuration. Accordingly, it is desirable to make the diameter of hinge mechanism 124 as small as possible. Any spring mechanisms needed are preferably instead incorporated into hinge mechanism 114, which preferably has a larger diameter. Because hinge mechanism 124 should be as small as possible it is preferably made of a material with a high elastic modulus and high tensile strength. Exemplary materials for hinge mechanism 124 are steel and stainless steel.

Flexible cantilevered members 126*a* and 128*a* connect hinge mechanism 124*a* to display modules 120 and 122 in a flexure embodiment, which is further detailed in FIGS. 7 and 8. These flexible members can deform to bend a distance of one half the diameter of hinge mechanism 124*a*, so that the centerline of hinge mechanism 124*a* moves from the stressed position centered with respect to planes 120*r* and 122*r* in the FIG. 5 to the unstressed, curved position flush with planes 120*r*, 122*r*, and 170 in the flat configuration shown in FIGS. 7 and 8.

In another embodiment (see FIG. 5 and FIG. 7), a plurality of interspersed feet such as 136, 137, 138, and 139 are at the perimeter of display modules 120 and 122 as shown in FIG. 5. In this embodiment, FIG. 5 shows that the feet 136, 137, 138, and 139 are interspersed so they do not engage each other in the fully closed configuration. However, in the flat configuration, FIG. 7 shows that they protrude one-half the diameter of hinge beneath the rear surfaces 120*r* and 122*r*. The orientation of FIG. 7 is that from a view of a person sitting across the table from the user, so that the QW keys are upside down and the feet below the displays are are visible. The collective protrusions of the feet 136, 137, 138, and 139 and hinge mechanism 124*a* all protrude to a common support plane. The maximum protrusions of these collectively define a support plane 170 generally parallel to the rear planes 120*r* and 122*r* in the flat configuration of FIG. 7. These feed obviate the need for flexing of members 128*a* and 128*b* used in the flexure embodiment.

Referring to FIG. 6, the cross section BB through hinge mechanism 114 shows that the centerline of hinge mechanism 114 lies in the plane of the most centered portions of keyboard modules 110 and 112, without any portion of modules 110 and 112 protruding to the right of the centerline shown as shown in FIG. 6. This allows keyboard module 112 to pivot around hinge mechanism 114 a full 180 degrees without keyboard modules 110 and 112 interfering with each other.

FIG. 7 shows a rear isometric view of the device in a flat configuration in which all four components (display 120, 122; keyboard 110, 112) can lie flat on a table or other flat surface. The perspective is changed from the front perspective of FIG. 1 to better see hinge mechanisms 132 and 130 and how the device can lay flat. The support plane 170 formed by the maximum downward protrusions from the rear surfaces 120*r* and 122*r* is coplanar with the plane of the flat table surface. The support planes 111 and 113 of the keyboard modules are also coplanar with the support plane 170, so that all four components of the device are supported and lay flat on a surface such as a table.

FIG. 8 shows flexible cantilevered members 128*a* and 128*b* in a flexure embodiment. In this embodiment, there are no interspersed feet such as 136, 137, 138, and 139. Instead, the support plane 170 simply coincides with the display module rear surfaces 120*r* and 122*r*. Note: The flexure is shown for a single hinge mechanism component 124*a* of hinge mechanism 124, but it applies for all components of hinge mechanism 124 (such as 124*b*).

Note from FIG. 7 that the z-coordinate of the axes of hinge mechanisms 130 and 132 should be set such they are a distance 172 above the support plane 170 in a flat configuration. Distance 172 is the same as the distance between these hinge mechanisms 130 and 132 and the support plane 170. This means that hinge mechanisms 130 and 132 are, when in the prone configuration, located halfway between the support planes 111 and 113 of keyboard modules and the support planes of the display modules. This allows the components to be coplanar and the device to lay flat, as can be seen in FIG. 7.

FIG. 7 shows mounts 174 and 176 are located adjacent to respective hinge mechanisms 130 and 132 that connect to display modules 120 and 122. The mounts may be incorporated into the hinges 130 and 132 or the display modules 120 and 122. The mounts are of materials of lower stiffness than other portions of the hinges and display modules to absorb shock. Tests have shown that mounts of high stiffness can transmit large accelerations and therefore large forces to break display modules 120 and 122. Accordingly, the mounts 174 and 176 preferably include shock absorbing materials to isolate the fragile components of display modules 120 and 122 from shock. With such shock absorbing mounts 174 and 176, in the fully closed configuration, the display modules are cushioned by the key springs of the keyboard keys and are extremely well protected from shock to enable the device to accommodate and protect brittle displays from shattering and soft displays from excessive bending or abrasion. Accordingly, these display modules can preferably made very thin and lightweight and facilitate the use of lightweight Organic Light Emitting Diode (OLED) displays. For example, Sony, Inc. showed an OLED display 0.2 mm thick at a Tokyo electronics show in 2008. Such very light weight displays are appropriate for this protected application.

With all surfaces coplanar in a flat configuration of FIG. 7, the device is now completely stable and firmly supported against any forces applied by touch and pen inputs. It is amenable to table-oriented applications such as Microsoft Surface.

Accordian Display

The embodiment of FIG. 1 includes a single pair of display modules. The single pair of display modules shown in FIG. 1 is directly extendable to a very large number of display modules that can be stacked in a zig-zag, accordion configuration.

FIG. 9 shows the display 300 in an accordion embodiment in an extended (flat) configuration. In the accordion embodiment, the accordion display 300 of FIG. 9 replaces the single display module pair 120 and 122 in the single row of FIG. 1.

Comparing display 300 with the display modules shown in FIG. 1, the accordion embodiment has display module pair 120 and 222, which form a first row of display modules 301, and additional pairs of display modules such as 220, 222, which form a second row 302, and 320, 322 which form a third row 303. Each pair is aligned side-by-side in a row. The hinge mechanisms connecting the first row to the second row fold with an axis to the rear of display 300, and the hinge mechanisms connecting the second row to the third rows fold with an axis to the front of display 300. In a zig-zag configuration, the hinge mechanisms connecting rows of display modules alternate from front to back, so that the folding alternates from front to back, allowing the rows to stack on one another to fold to the footprint of a single row of display modules in a prone configuration. FIG. 10 shows a side view of the display 300 folding into zig-zag configuration.

When the display 300 shown in FIG. 10 is folded to the stack of a single row in the prone configuration, the axes of hinge mechanisms such as 124, 224, and 324 are interspersed along a shared axis. This allows the stack to be folded a second time (crossfolded) about this shared axis to a fully closed configuration. Pair 220, 222 is connected through hinge mechanism 224 which has components 224a and 224b. Pair 320, 322 is connected through hinge mechanism 324 which has components 324a and 324b. Note in FIG. 10 that hinge mechanisms connecting display modules in different rows are at different locations with respect to the respective display module's edge. The locations are different so that these hinge mechanisms do not interfere with each other but are instead are interspersed with each other when folded.

FIG. 9 shows hinge mechanisms 330 and 332 on the front of display 300 and hinge mechanisms 230 and 232 on the rear of display 300. These hinge mechanisms alternate to facilitate the zig-zag accordion style folding of the display modules through these hinge mechanisms. For example, for configurations with three rows of display modules, the zig-zag folding facilitates the folding of the device such that, while folding from the extended configuration to the prone configuration, the three alternating rows resemble the three line segments in the (backwards facing) letter Z as in FIG. 10.

FIG. 9 shows hinge mechanisms 330 and 332 with axes in front of the display and hinge mechanisms 230 and 232 with axes on the rear of the display. This allows the top row, (display modules 320 and 322) to fold front-to-front with the middle row (display modules 220 and 222) and allows the middle row to fold back-to-back with the bottom row (display modules 120 and 122). This enables the display to collapse in a zig-zag configuration shown in FIG. 10.

Alternately, all four of hinges 230, 232 330 and 332 could be arranged with axes located to the rear of the display. This alternate, roll-up arrangement enables the display to collapse in a roll-up configuration. In the roll-up configuration, the top row first folds backward to lie against the middle row in a back-to-back configuration. This combined top and middle row stack then again folds backward (rolls up) to lie against the rear of the bottom row with the front of the top row facing the rear of the bottom row. This roll-up is similar to the roll-up of finger segments when making a first. To allow space for the top row to be so sandwiched between the middle and bottom rows, the axes of hinge mechanisms 230 and 232 must be located a distance behind the rear surfaces at least one-half the thickness of the top row. By extension, if a fourth row is to be rolled around the stack of three, the hinge mechanisms connecting the fourth row would need to be located a distance behind the rear surfaces at least one full row thickness. A fifth row would require its connecting hinge mechanisms to protrude one-and-one-half row thicknesses, and so on.

An advantage of the roll-up configuration is that all hinges that connect the rows can be located behind the display, so as not to obstruct the view of the open planar display. An advantage of the zig-zag configuration is that all of the axes of the hinge mechanisms connecting the rows can be flush with the front or rear surface of the given row and not protrude away from the surface. Another advantage of the zig-zag configuration is that all rows can be unfolded simultaneously, whereas rolling or unrolling the roll-up is done one row at a time.

Hinge mechanisms 124 and 324 have axes of rotation that lie behind the front surface of the display 300 in the extended configuration of FIG. 9. Hinge mechanism 224 has an axis of rotation that lies in front of the front surface in the extended configuration of FIG. 9. This location alternates so that all three axes become coaxial when folded to the zig-zag closed configuration. Hinge mechanisms such as 224 that are located in front of the extended display while viewing are undesirable because they can block viewing. Accordingly, another embodiment is free of hinge mechanism 224 and free of any hinge mechanisms directly connecting display modules 220 to 222; see FIG. 11. In this embodiment, display modules 220 and 220 are held aligned at the top by the connections via hinge mechanisms 330 and 332 to aligned display modules 320 and 322 and are aligned at the bottom by the connection via hinge mechanisms 230 and 232 to aligned display modules 120 and 122. This alternate support obviates the need for the forward-protruding hinge mechanism, which can be undesirable in some embodiments.

FIGS. 9 and 11 show hinges such as hinge 324b connected to the display module 320 through its hinge component 326b at a different place than hinge 330. The two connection locations need not be different. For example, hinge 324b may be directly commented to the component of hinge 330 that is attached to display module 320. This can reduce the number of needed attachments to the display module. Note: In FIGS. 9, 10, and 11 the callouts 326a and 328a refer to components of hinge 324a; 226a and 228b refer to components of hinge 224b; and 126b and 128b refer to components of hinge 124b. Not all hinges and hinge components are labeled in FIGS. 9, 10, and 11. The comprehensive listing and consistent labeling of all hinges and hinge components is shown in the end view of FIG. 12. Because of the large number of hinges and hinge components, the hinges 124a, 124b, 224a, 224b, 324a, and 324b and their components are labeled collectively in mass in FIG. 12. For clarity, the perspective views of FIGS. 9 and 11 label only a subset of a few "typical" hinges with their components (for example, hinge 124b with its components 126b and 128b). Also for clarity and brevity, the set of hinges 124a and 124b, when referred as a set, are collectively referred to as hinges or hinge mechanisms 124. This same, consistent convention used for hinge 124 used for hinges 224 and 324.

After the zig-zag folding to the prone configuration, and after the second fold (the crossfold) is effected by folding hinge mechanisms 124, 224, and 324, the device reaches the fully closed configuration shown in FIG. 12.

FIG. 12 shows an end view of the display modules when the display modules are in the fully closed configuration. This view is analogous to the cutaway view of FIG. 5. Note that the additional cantilevered members 226, 228, 326, and 328 are curved or angled so that the hinge mechanisms 124, 224, and 324 can share a common axis. A flatter angle leads to the common axis being closer to the display modules and reduces the gap between the display modules. In the end view of FIG. 12, the "a" and "b" components of the hinge mechanisms and cantilevered members are indistinguishable and are therefore dropped.

Note in FIG. 12 that the two stacks of display modules fold to form a shape similar to the letter U in its side, with one common folding axis of hinges 124, 224, and 324 forming the bottom of the letter U. One of the parallel legs of the U are formed by the display modules 122, 222, and 322, and the other by display modules 120, 220, and 320.

In other embodiments, this is extendable to more than two stacks. For example, four stacks of modules can fold to form a shape similar to the letter W, with three common folding axes forming the three turning points in the letter W and the four stacks of display modules forming the 4 straight line segments of the letter W.

The folding and unfolding sequence is similar to that performed on a road map. To unfold, first, the stacks on the U or W are straightened along their common folding axes to form a straight shape with stacks of display modules aligned in a straight line. Second, the stacks are unfolded in the other direction from their zig-zag configuration to the fully extended configuration. In the fully extended configuration, the display modules are adjacent to each other and aligned in a coplanar state.

An accordion display uses the cross-fold principle to extend the crossfold computing device to allow for multiple sets of display modules, in particular OLED displays.

Contiguous Display

Referring to FIG. 15, a cross fold computing device 500 includes four display modules 620, 622, 720, and 722 arranged in two columns 920 and 922 and in two rows. This can also include a first keyboard module 510 and a second keyboard module 512. This has many elements similar to those in FIG. 1 which will not be described here. A significant difference is that there are four display modules are arranged in two columns 920 and 922 and the active portions of the displays are contiguous or nearly contiguous.

When the display modules are configured in a coplanar configuration shown in FIG. 15, the active portions of the display modules that display information collectively form a generally coplanar and nearly contiguous front display surface 510.

In the coplanar configuration of FIG. 15, the display surface 510 has a perimeter 525. A viewing region in front of the display surface 510 is preferably free of any hinges or other obstructions to the view of a user sitting in front of the display. This viewing region includes all points within the perimeter 525 and directly (perpendicularly) in front of the display surface 510. Accordingly, an embodiment has hinge mechanisms located either behind the display surface 510 (for example, hinge mechanisms 630 and 632) or located outside of the perimeter 525 (for example, hinge mechanisms 724a and 724b). By so locating the hinges outside of the viewing region, the hinges do not block the user's view of the display surface 510.

Hinges 630 and 632 can have springs 631 and 633 to urge each of the two display columns 920 and 922, respectively, toward a flat coplanar configuration.

The device is capable of being folded from the coplanar configuration of FIG. 15 to a closed configuration by first folding the display modules about the axes of hinge mechanisms 620 and 622 and folding the display and keyboard modules about hinge mechanisms 530 and 532. Next, the device is folded about the now collinear axes of hinge mechanisms 514a, 514b, 724a, and 724b to form a single stack of parallel display and keyboard modules.

Adjacent to the perimeter 525 of the front display surface 510 are electronic display driver components such as 527 which selective highlight the individual pixels. Each of the display modules has two such display drivers oriented at two perpendicular edges of the display modules to control the rows and columns of pixels on the display module. The eight display driver modules can be located at the perimeter of the front display surface so as not to interrupt the front display surface.

Referencing the orientation in FIG. 15, a left keyboard module 510, suitable for typing by the left hand of the user, display module 620 and to module 620 is attached, in turn, module 720. Display modules 620 and 720 are arranged to form a left display module column 920. Similarly, right keyboard module 512 has attached to it display modules 622 and 722 arranged to form a right display module column 922. In this arrangement display 620 and 622 form a first row and display 720 and 722 form a second row.

In FIG. 15 the bottom of display module column 920 is pivotally connected to keyboard module 510 and the bottom of display module column 922 is pivotally connected to keyboard module 512. The bottom of each display module in the second and any subsequent rows are pivotally connected to the top of a display module in the previous row. For example, hinge 630 connects the bottom of display 720 in the second row to the top of display 620 in the first row. Additional rows could be added by similarly pivotally connecting additional display modules to the last display module on each of the left column 920 and right column 922. With the hinges such as 630 urging the components in each column to a coplanar state, these hinges urge each of the right and left columns 920 and 922 to separate coplanar states.

To further enforce the coplanar state, a mating alignment mechanism may be used between adjacent columns. Alignment pins near the center of the four displays may align columns 920 and 922. For example, convex and concave conical ends of elongated versions of hinge mechanisms 630 and 632, respectively, may engage each other at the interface between columns 920 and 922 when the device is unfolded through hinge mechanism 724a. For another example, the inner vertical edges of display modules such as 720 and 722 could be contoured to meet each other in a tongue-and-groove interface 721. The tongue-and-groove method of alignment is known in the art of woodworking, to which the reader is referred. Tongue-in-groove interfaces are typically used in hardwood floors to align adjacent boards to maintain an even, planar floor surface. An example of a tongue-in-groove interface between hinged components is described in U.S. Pat. No. 4,620,581, especially FIG. 24. In this method a protrusion (tongue) on one edge engages a depression (groove) on its mating edge. The allowable depth of the tongue may be limited for displays adjacent to the folding axis; accordingly, the tongue may need to be trimmed to fold into engagement with the groove without interference. Using the tongue-and-groove or alignment pin method helps the hinges at the top and bottom, outside of the display area, align the columns and helps obviate the need for additional hinges that could obstruct the display.

Referring to FIG. 16 of the current drawing, the design and advantage of the tongue-in-groove interface 721 is better understood. The visible top 721t of the tongue in groove interface 721 is seen adjacent to the tops of display modules 720 and 722 and adjacent to hinge mechanism 724a. The interface 721, in enforces alignment of the tops of display modules when the modules are opened to a planar state through pivoting of hinge mechanism 724a. More importantly, the tongue-in-groove interface 721 aligns portions away from the top and away from hinge mechanism 724a where alignment is more needed. In some embodiments the tongue protrudes further to engage first near the hinge mechanisms, and the tongue is tapered to protrude less prominently away from hinge mechanisms, so that the engagement propagates away from the hinge as the display is fully opened. Thus the hinge mechanisms locally align the displays and ensure that the tongue-in-groove engagement is properly started, and when the first portion of the tongue is engaged properly the remainder is guided into place and tends not get off track.

At least one hinge mechanism such as 724a is desirable to align the top of the coplanar left column 920 with the top of the coplanar right column 922 to force the two columns to the same common coplanar state.

At least one alignment mechanism is desirable to align the bottom of the coplanar left column 920 with the bottom of the coplanar right column 922 to force the two columns to the same common coplanar state.

One such bottom alignment mechanism may be a direct connection between display module 620 and 622 provided by hinge 724b.

An alternate bottom alignment mechanism may be an indirect connection between display module 620 and 622 provided collectively by keyboard modules 510 and 512 and hinges 530, 532, 514a, and 514b, which are collectively configured to align the bottom of the coplanar left column 920 with the bottom of the coplanar right column 922 such that the axes of hinge mechanisms 530 and 532 intersect.

FIG. 15 shows an embodiment with two columns of displays. Other embodiments can have three, four, or more columns of displays. For example, FIG. 16 shows third 918 and fourth 924 columns of displays adjacent to the first and second columns 920 and 922.

The additional columns shown in FIG. 16 provide more surface area. However, the additional columns limit the positioning of display driver components. Each of the 4 display modules shown in FIG. 15 has two of its edges on the perimeter to accommodate display driver components such as 527. With the 8 display modules configured in FIG. 16, some of the 8 display modules have only one edge rather than two edges on the perimeter.

FIG. 16 shows a device with eight display modules arranged to be foldable to a single stack of modules. The display can be collapsed by first folding its rows along the four coaxial hinge mechanisms 628, 630, 632, and 634 shown in FIG. 16, and by folding the display assembly downward about hinge mechanisms 530 and 532 to lie flat on keyboard modules 510 and 512. So far this folding is similar to the collapse of the four display modules shown in FIG. 15. However, the additional stacks of rows formed by rows 918 and 924 in FIG. 16 next fold on top of the stacks formed by columns 920 and 922, by pivoting about hinge mechanisms 919 (a and b) and 923 (a and b), respectively. The final fold along coaxial hinges 514a, 514b, 724a and 724b results in a single stack.

TABLE 1 shows locations of the hinge mechanism axes that allow the axes being coaxial for the final fold. TABLE 1 first lists the locations of the axes as the distance in front of or behind the display. The orientations of the axes are in terms of the view shown in FIG. 16, in which the keyboard is horizontal and the display is approximately vertical. The distance is measured in thicknesses of a typical display module.

TABLE 1

| LOCATION OF AXES IN FIG. 16 | | | |
|---|---|---|---|
| DISTANCE | FROM | ORIENTATION | HINGE MECHANISM NUMBERS |
| 0 | Front | Vertical | 919a, 923a |
| 2 | Front | Vertical | 724a |

TABLE 1-continued

| LOCATION OF AXES IN FIG. 16 | | | |
|---|---|---|---|
| DISTANCE | FROM | ORIENTATION | HINGE MECHANISM NUMBERS |
| 1 | Front | Vertical | 919b, 923b |
| 3 | Rear | Vertical | 724b |
| 0 | Rear | Horizontal | 628, 630, 632, 634 |

Hinge mechanism 724a as shown in FIG. 16 is positioned a distance of 2 in front of the displays 720 and 722 to accommodate the 2 displays in each of rows 918 and 924 when they fold on top of rows 920 and 924, respectively. The axis of hinge mechanism 724a is then flush with the tops of the two stacks so that they can be folded.

In the configuration shown in FIG. 16, the common axes of hinge mechanisms 919a and 923a are configured above the stacks, so that the stacks from the outer columns 918 and 924 can fold on top of the stacks from the inner columns 920 and 922.

In an alternate configuration (not shown), the common axes of hinge mechanisms 919a and 919b are configured below the stacks (closer to the keyboard keys) so that the stacks from the outer columns 918 and 924 can fold under the stacks from inner columns 920 and 922.

In either case, finally, the two combined stacks are folded together about the common axes that coincide with the y axis to form a single stack, sandwiched between keyboard sections 110 and 112.

FIG. 16 shows a configuration with two rows of display modules. The configuration can be readily extendable to include additional rows. For three or more rows to fold in a zig-zag configuration the horizontal hinges such as 630 would alternate from front to rear and their axes would alternate between being adjacent to the front display surface below odd rows and adjacent to the rear of the display modules below even rows, where the row numbering begins at the bottom row. The distances in TABLE 1 for the vertical axes could be calculated by simply stacking the desired number of display modules in a single stack and measuring the distance from each display module to the common y-axis at the center of the stack.

FIG. 16 shows a configuration with four columns of display modules. This configuration can be readily extendable to more than four columns. Each half of the display can fold in a zig-zag configuration on top of each of the keyboard sections 510 and 512, and then finally fold in half for the final fold between keyboard sections 510 and 512.

FIG. 16 shows an optional tongue-and-groove interface 721 at the vertical border where display module 720 abuts against display module 722. This interface 721 is typical and can be present in any of the vertical borders between display modules. In some cases the tongue-in-groove interface such as 721 can obviate the need for hinge mechanisms such as 724a.

The tongue-in-groove interface has the advantage that it can maintain alignment between two display module columns and remains completely internal and contained between the front and rear display module surfaces. This is particularly useful where protruding hinge mechanisms such as 724a would obscure viewing the display or interfere with folding. Interference is a greater problem in roll-up designs, in which one row of the display module rows (typically the top row as seen, for example, in FIG. 11) is the first to roll-up and therefore will be sandwiched between other display modules in the rolled-up configuration, with limited room for protruding hinges. Such roll-up configurations do allow for protruding hinges at the bottoms of the display modules (such as 724b in FIG. 16 or 124b from FIG. 11). The hinges at the bottom are the last to roll-up and therefore are on the outside of the roll, and therefore have room for protruding hinges.

FIG. 17 shows a side view of a roll-up display in a partially rolled up configuration. In contrast to the zig-zag configuration shown in FIG. 10, the rolled up configuration has the rows spiral inward, so that a display module 320 in the top row is sandwiched between the display modules 220 and 120 in the middle and bottom rows. A cross fold hinge 724b that connects display modules 120 and 122 in adjacent columns at the outer end of the first row is outside the roll up and does not interfere with the roll-up. However, there is not room for a similar hinge at the innermost end of the top row (to connect display modules 320 and 322) because it is inside the rollup. Accordingly, tongue-in-groove interfaces 171, 271, and 371 are shown to align the columns in lieu of a hinge at the top. For example, tongue-in-groove interface 371 aligns display module 320 with display module 322.

In contrast, in FIG. 10, the protruding hinge mechanisms 124, 224, and 324 (a and b), protrude through a gap between rows of display modules. Comparing FIG. 10 to FIG. 17, it is seen that the roll-up configuration with the tongue-in-groove interfaces of FIG. 17 reduce the need for such hinges and the need for gaps between the rows of displays to accommodate such hinges. Furthermore, all of the hinges connecting columns of displays, namely hinge mechanisms 230, 232, 330, and 332 in FIG. 17 are on the rear surface of the display, allowing for a continuous display surface on the front surface uninterrupted by hinging mechanisms. Accordingly, larger arrays of display modules, such as the 3×2 array in FIG. 9, the 2×2 array shown in FIG. 15, the 2×4 array shown in FIG. 16, or larger arrays could use the roll-up hinge arrangement shown in FIG. 17 and could use tongue-in-groove interfaces as shown in FIG. 17 to reduce or eliminate interruptions to the display surface.

The tongue-in-groove interface has the disadvantage in that it can slip out of engagement. This disadvantage may be resolved (at the expense of more complexity) by designing a slight interference between the tongue and groove such that it "snaps" in and out of engagement. It can also have an engagement lock that is locked and unlocked manually or through some other locking mechanism.

Squeezed Keyboard

Having shown methods to reduce the width of the footprint of a device in the closed configuration by half through folding, the depth of a device can also be reduced through changing the aspect ratio of the keys.

FIG. 13 shows the representative letter keys on two halves of split keyboards 178 and 178a. Keyboard 178 has the standard aspect ratio of 1:1 and keyboard 178a has a reduced aspect ratio of 0.6:1. Here the aspect ratio is defined as the ratio of the key depth 180 to the key width 182, which, in a standard keyboard with key dimensions of approximately 19 mm×19 mm, is approximately 1:1. The pertinent dimension is the key at its widest point at the base, which determines the key spacing and in turn the total device dimension.

A squeezed keyboard 178a is shown in FIG. 13. The standard key depth 180 is reduced by 60% to yield the reduced key depth 180b. The reduced key depth is applied in the squeezed keyboard 178a to all three rows of letter keys in the standard QWERTY keyboard. It can further reduce the dimension in to also reduce the aspect ratio of the row of number keys as well. The key width 182a in the squeezed keyboard 178a is kept the same as the key width 182 in the standard keyboard 178. As a result, the squeezed keyboard 178a keeps the full 19 mm key width 182a to accommodate the spacing of user's the fingers so that user can comfortably rest adjacent fingers on adjacent keys without overlap. The squeezed keyboard 178a maintains this spacing while reducing the dimension in the y-direction by approximately 40%, enabling the closed device to better fit into a pocket. In an alternate embodiment in which restrictions along this dimension are not as severe, the aspect ratio in the squeezed keyboard 178a is 0.8:1.

Implementing this reduced aspect ratio consistently to all the letter keys in the squeezed keyboard embodiment 178a both minimizes confusion of the fingers in typing and also maximizes the gains in portability realized by reducing the aspect ratio. Other keys such as the spacebar and arrow keys (not shown), may also be reduced in height, but most of the gains are realized in the letter and number keys.

Retracting Touchpad

FIG. 14 shows a touchpad 184 that is pivotally attached to the keyboard module 112. The touchpad 184 is preferably stored inside the housing immediately adjacent to its outer shell.

The pivoting is important for several reasons. First, it allows the electrical connections (wires or strip conductors) to only twist. In contrast, in a sliding mechanism, the wires change location and configuration, and need to translate with the sliding touchpad. When a slide-out touchpad is retracted, the wires would need to be pushed back to return to their retracted positions without tangling.

Second, it allows the keypad to be stored in an off-center stored location 186 and rotated to a centered location 184 for use in a split keyboard device. The configuration of components in a computer can make it undesirable to store the touchpad in a centered stored location to directly slide to a centered operational position. It is particularly difficult in a split keyboard configuration, wherein the keyboard folds at the center for storage. The touchpad 184 can pivot from a stored off-center position 186 to an exposed operating position 189 that is more centered with respect to the keyboard. Third, the attachment of the pivoting mechanism can be at a single pivot 188. In contrast, sliding devices typically involve a pair of rails each of which are at least as long as the sliding distance of the touchpad. Thus, the touchpad can require only a limited part of the housing that needs to be dedicated to the mechanical attachment of the touchpad.

Fourth, the pivoting mechanism 188 facilitates a torsional spring 190 which can push the touchpad to rotate toward the open position and obviate the need to pull out the touchpad. For reasons similar to those recited for the advantage of only twisting wires, the torsional (twisting) spring can also be more compact and its motion more simple than a linear spring. The movement of the spring, which is near the pivot axis is less than the movement of the touchpad, which is further from the pivot axis.

A latch 187 may automatically release the spring and expose the touchpad when the keyboard is opened. Alternately, a latch may be manually disengaged by pushing the touchpad inward a short distance so that the touchpad pops out when the pushing force is released. Similarly, the touchpad may be manually pushed toward its stored position or may be automatically retracted to its stored position when the keyboard is closed.

The touchpad 184 may be non-rectangular. One or more corners of the rectangular touchpad may be removed so that it can fit within the footprint of the keyboard. The distal portion of the touchpad may be narrower than the proximal portion of the touchpad. The distal and proximal are referenced to the distance to the pivot 188.

Many techniques and aspects of the inventions have been described herein. The person skilled in the art will understand that many of these techniques can be used with other disclosed techniques, even if they have not been specifically described in use together. Or, conversely, they can be used alone, without combination with the items shown here, or with different combinations.

For instance, a cross-fold mechanism has been shown that can be arranged in an open laptop configuration and a prone cell-phone configuration. However, it is an invention hereof to use a cross-fold mechanism with a cell-phone configuration alone (for instance with two sided displays) without being transformable to an open laptop configuration. Or, it is also an invention hereof to use a cross-fold mechanism configurable in an open laptop configuration, but not a prone cell-phone configuration. Similarly, accordian-fold relationships have been shown in combination with a cross-fold mechanism, but they may be novel and useful without combination with a cross-fold mechanism. Additional independent inventions may include using interspersed, coaxial hinge mechanisms; a two-sided display; a reduced aspect ratio keyboard; a retractable touch pad, any of which can be used in combination with one or more of any other.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While these inventions have been particularly shown and described with references to preferred embodiments thereof, it will be understood by those skilled in the art that various changes in form and details may be made therein without departing from the spirit and scope of the inventions as defined by the claims. For example, USB ports, cameras, GPS, wireless communications capability, and various pointing devices may be included, and the components of the inventions such as the display may be used together or separately.

The corresponding structures, materials, acts and equivalents of all means or step plus function elements in the claims below are intended to include any structure, material, or acts for performing the functions in combination with other claimed elements as specifically claimed.

Having described the inventions, what is claimed is:

1. A transformable display device, comprising:
   a. a first display module;
   b. a second display module;
   c. a third display module;
   d. a fourth display module;
   e. a first hinge connecting said first and second display modules, said first hinge having at least two axially spaced apart rotatable components;
   f. a second hinge connecting said first and third modules;
   g. a third hinge connecting said second and fourth modules; and
   i. a fourth hinge connecting said third and fourth display modules, said fourth hinge having at least two axially spaced apart rotatable components;
   wherein, when said first, second, third and fourth display modules are in a collapsed configuration, said at least two rotatable components of the first hinge are positioned between the rotatable components of the fourth hinge.

2. The device of claim 1 wherein said first hinge includes at least two spaced apart rotatable components.

3. A transformable display device, comprising:
   a. a first display module;
   b. a second display module;
   c. a third display module;
   d. a fourth display module;
   e. a first hinge connecting said first and second display modules;
   f. a second hinge connecting said first and third modules;
   g. a third hinge connecting said second and fourth modules; and
   h. an alignment mechanism for aligning said third and fourth modules;
       wherein said alignment mechanism facilitates engagement and disengagement of said third and fourth modules without an elastic material spanning said alignment mechanism,
   wherein the device:
   a. is expandable in a cross-fold manner in which the hinge mechanisms locally align the third and fourth displays to ensure that the alignment mechanism engagement is properly started, and
   b. is collapsible such that the cross-folding of the first hinge causes disengagement and separation of the alignment mechanism.

4. The device of claim 3 wherein said alignment mechanism permits separation of said third and fourth modules and said third and fourth modules have no direct connection along an edge of the third and fourth modules in a collapsed condition.

5. The device of claim 3 wherein said alignment mechanism comprises a first mating surface on the third module that can engage with a second mating surface on the fourth module.

6. The device of claim 5 wherein said alignment mechanism comprises a tongue-in-groove interface.

7. The device of claim 3 that is expandable to an extended configuration in which the four modules are in an adjacent coplanar configuration and collapsible to a collapsed configuration in which the four modules are in a stacked parallel configuration.

8. The device of claim 3 wherein the alignment mechanism comprises a tongue-in-groove mechanism and wherein the alignment mechanism engagement comprises a tongue-in-groove mechanism engagement.

* * * * *